Dec. 31, 1963

E. E. LAWSON, JR 3,115,866

AUTOMATIC LIVESTOCK FEEDER

Filed Feb. 1, 1961

INVENTOR.
ERNEST E. LAWSON, JR.,

BY

ATTORNEY.

INVENTOR.
ERNEST E. LAWSON, JR
BY John J. Schneider
ATTORNEY.

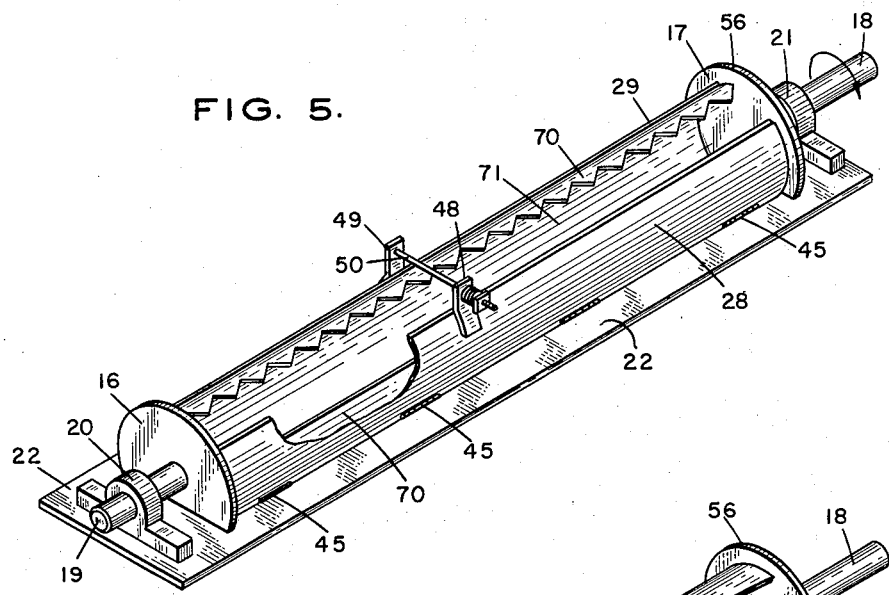
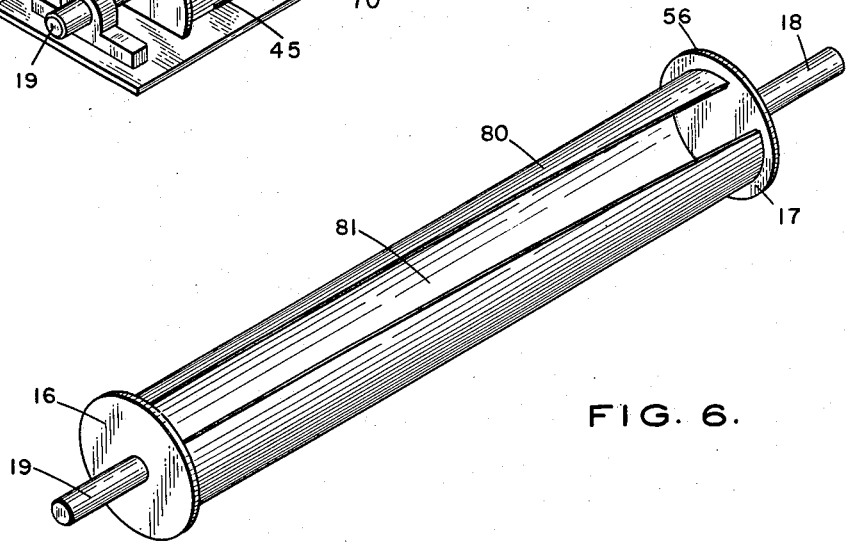

United States Patent Office 3,115,866
Patented Dec. 31, 1963

3,115,866
AUTOMATIC LIVESTOCK FEEDER
Ernest E. Lawson, Jr., 10225 Moorberry,
Houston 43, Tex.
Filed Feb. 1, 1961, Ser. No. 86,380
12 Claims. (Cl. 119—56)

The present invention concerns feeding apparatus for livestock. More particularly, it concerns an automatic power operated device for dispensing feed from a storage bin into a feeding trough in preselected, measured quantities at preselected times.

Livestock feeding operations, in general practice, are divided into two categories, viz, (1) full feeding or "dry lot" operations and (2) supplemental or "creep" feeding. In full feeding operations, the animal is confined to a relatively small enclosure and all feed the animal consumes is carried or transported to it. In supplemental feeding, the animal is permitted to run on pasture and is fed high protein feeds to supplement the pasture roughage. Limited amounts of a high protein feed fed to livestock on pasture will improve the animal's digestive action, resulting in increased growth and rate of gain in body weight and improved "carcass finish" or quality of meat.

Full feeding operations strive to produce the maximum amount of increase in animal body fat with the minimum amount of feed and in the shortest practical time and in this type feeding, livestock feeder devices commonly are used to convey the feed to the livestock each time they are to be fed. As this process is laborious and time consuming, the livestock are fed only once or twice a day. However, this manner of feeding generally requires placing excess feed in the feed trough so that feed will be available to the animals until the next feeding time. This results in wasted feed and poor eating characteristics of the livestock as it is known that livestock prefer fresh feed rather than feed that has been exposed excessively to dust, air, insects, saliva, and other contaminants. It is known also that livestock gain weight more efficiently if fed fresh feed three or four, or more, times daily than if they are fed large quantities of feed once or twice daily.

In supplemental or creep feeding operations, feed troughs are located or placed in livestock pastures at sites frequented by the livestock. These sites usually are located some distance from barns or other feed storage locations and feed is hauled to the feed troughs from the feed storage daily or self-feeders are employed. Self-feeders utilize gravity flow of feed into the feed trough from a storage bin built above it. As feed is eaten from the trough, adidtional feed falls from the storage bin into the trough. The process of hauling feed from the storage barn to the livestock daily is time consuming and expensive and the self-feeders aid in lessening the time consumed and expense by reducing the labor involved but they are disadvantageous in that the livestock consume more feed than is necessary to obtain desired results.

The present invention concerns an improved self-feeder device which in brief comprises a rotary dump mechanism driven by an electric motor controlled by a repetitive time cycle controlled to dispense feed in predetermined quantities and at preselected time intervals. The rotary dump mechanism is arranged in the bottom of a V-shaped dump storage bin and fills and dumps by gravity. In a preferred embodiment, the dump mechanism consists of an elongated cylindrical barrel or drum provided with a window or windows cut from the barrel spirally along the longitudinal axis thereof. In another embodiment of the invention, one edge of a non-spiral window cut from the barrel is formed with serrations. Rotation of the barrel automatically seals the bottom of the storage bin and dumps feed into a feed trough located below the barrel. Any quantity of feed can be dispensed at any preselected time by constructing the dump mechanism a desired size and length and by rotating the dump barrel through a desired number of revolutions during each actuated cycle. The apparatus can be used in dry lot or full feeding operations but principally is for use in creep feeding operations and accordingly it is preferably located in a pasture remote from the feed main storage location and operated to dispense preselected amounts of feed at predetermined times.

A primary object of the invention is to provide a completely sealed storage bin equipped with a positive quantity feed measuring and discharging device for distributing feed at all points simultaneously along the length of the feed trough. Another object of the invention is to provide a sealed feed measuring and feed discharge apparatus that is simple in construction, reliable in operation, and controllable by timing devices. An additional object of the invention is to provide a sealed feed measuring and discharge device that requires a minimum of power so that it is economical to operate and is capable of operation for long periods of time on conventional storage batteries. A further object of the invention is to provide a device that functions satisfactorily under unattended, automatic operations regardless of erratic feeding schedules of livestock.

The above objects and other objects and advantages of the invention will be apparent from the following description when taken in conjunction with the drawings wherein:

FIGS. 5 and 6 are perspective views of alternate dump cylinders or drums.

Figure 1:
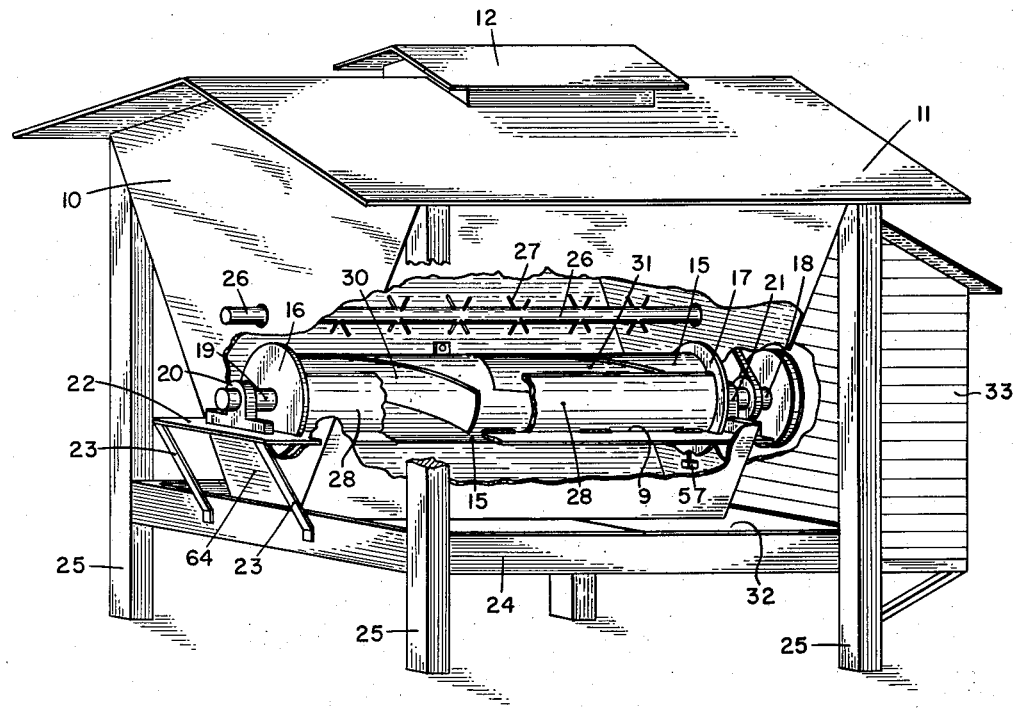
FIG. 1 is a perspective view of the automatic feeder of the invention with parts broken away and sectioned to show structural detail.

For a better understanding of the operation of the invention, reference is made to the drawings in greater detail. In FIG. 1 is shown a V-shaped feed storage bin 10 provided with a protective roof 11 which is, in turn, provided with a fill opening (not shown) over which is arranged a lid 12. A rotatable cylindrical dump barrel or drum 15 is arranged in storage bin 10. The ends are closed by end plates 16 and 17 to which are connected, respectively, rotatable drum supporting and rotating shafts 18 and 19 which are mounted in suitable bearings 21 and 20, respectively. A drum divider and bearing support plate 22 provided with an opening 9 through which a portion of drum 15 extends is supported on struts 23 secured to a frame 24 which includes posts or legs 25. A rotatable agitator shaft 26 provided with longitudinally spaced apart agitator prongs 27 is arranged in bin 10 above drum 15. Two guard plates 28, 29 (see FIG. 3) curved to conform to the curvature of drum 15 are hingedly supported on support plate 22. Two longitudinally extending "windows" or openings 30, 31 have been cut spirally in drum 15. A catch trough 32 is positioned below bin 10. Shaft 18 has connected thereto various drives which are contained in a drive and control housing 33.

Figure 2:
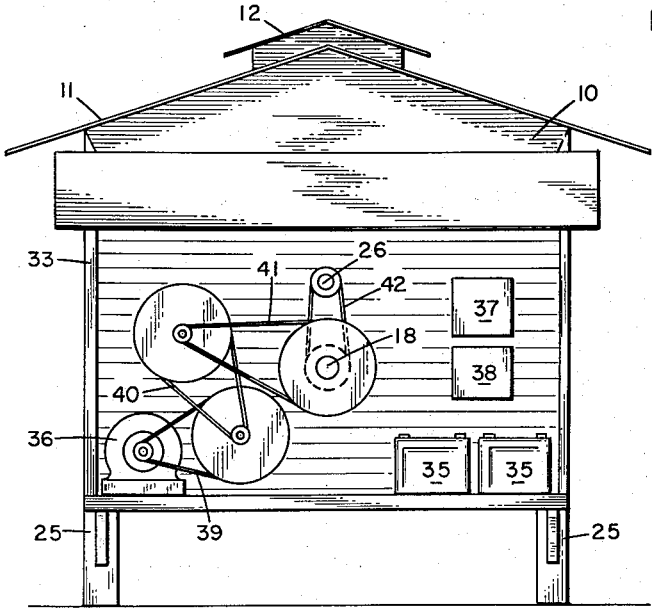
FIG. 2 is an elevational end view of the feeder showing the interior of the drive and control house.

In FIG. 2 the interior of the drive and control housing is shown. Batteries 35 or other conventional electric power source provide the source of power for a motor 36 controlled by timer switches 37 and 38. A drive train including drives 39, 40, and 41 rotate shaft 18 and, in turn, drum 15. Rotation of shaft 18 also rotates shaft 26 through a drive 42.

Figure 3:
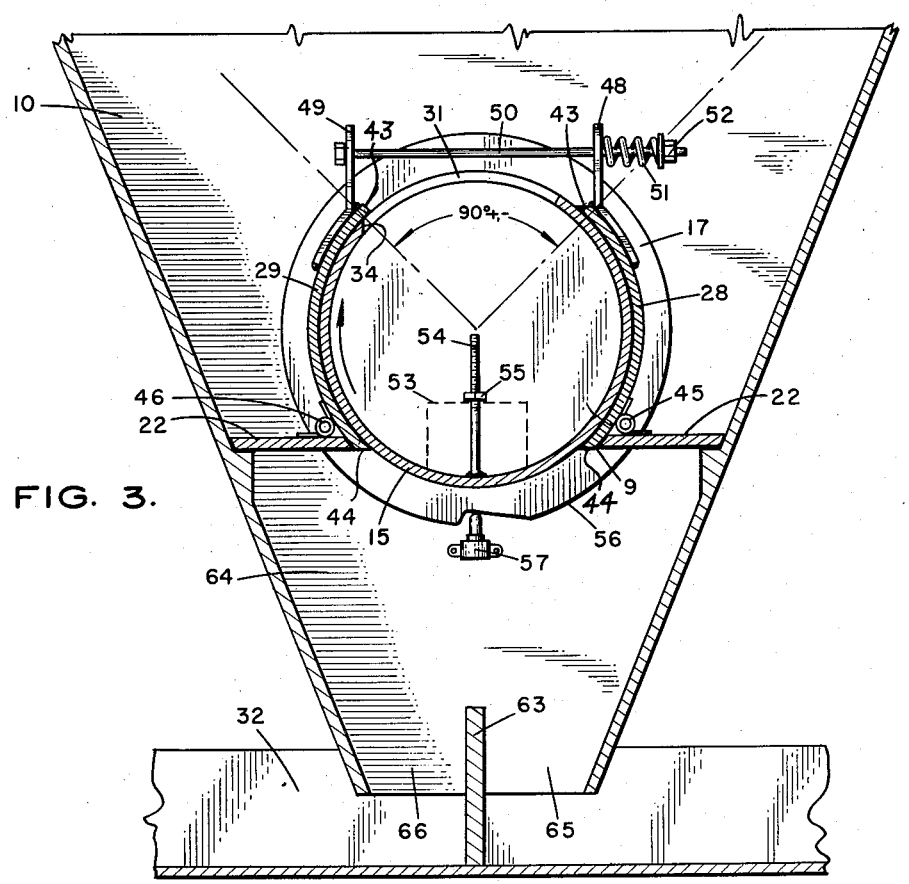
FIG. 3 is an enlarged elevational sectional view of the apparatus of FIG. 1.

Rotary dump barrel 15 and associated structure are seen more clearly in FIG. 3. As shown therein, guard plates 28, 29 having upper and lower ends 43 and 44 are hinged by hinges 45, 46 adjacent opening 9 to divider plate 22. Each guard plate extends approximately 90° along a side of drum 15. The upper end 43 of guard plate 28 and the lower end 44 of guard plate 29 are beveled or tapered to provide a knife-like cutting edge which cooperates with a beveled or tapered surface 34 one one edge of the cut or cuts in drum 15 to effect a more efficient cutting action on the feed. Guard plates 28, 29 are held in engagement with drum 15 by one or more tension members, each of which includes plates 48 and 49 secured to the upper ends of guard plates 28 and 29, repectively, a bolt 50, and a biasing spring 51 and nut 52. The cut of the window or opening 31 as shown in FIG. 3 is approximately 80° and it spirals uniformly a desired amount. The size of the opening can be varied depending on the diameter of drum 15. The only limitation on the extent or degree of the spiral is that no part of the opening can be exposed to both the upper and lower spacings between the guard plates at the same time. Opening 30 (FIG. 1) is spiralled and circumferentially positioned similarly as opening 31. Any number of openings may be used along the length of barrel 15. Multiple openings permit greater degrees of spiral for any given size drum opening. The greater the degree of spiral of the cut the more efficient is the cutting action. Therefore, greater spiral of the cut results in less horsepower requirement than would the case be with a less spiralled or non-spiralled cut.

If desired, removable drum volume changing blocks 53 shown in dotted lines in FIG. 3 may be inserted in drum 15 on bolts 54 and releasably secured thereto by means of nut 55. Use of the volume changing blocks permits ready variance of the capacity of drum 15 with resultant increased flexibility when operating with any given drum size.

Additional capacity for the feeder apparatus in general may be readily achieved by coupling two or more units of any given size together.

Catch trough 32 is provided with a feed divider partition 63 which extends into the dump chute portion 64 of bin 10 and divides the feed exit opening into two parts 65, 66.

The edge of end plate 17 forms a cam surface 56 which is used to turn on and off a micro master switch 57.

Figure 4:
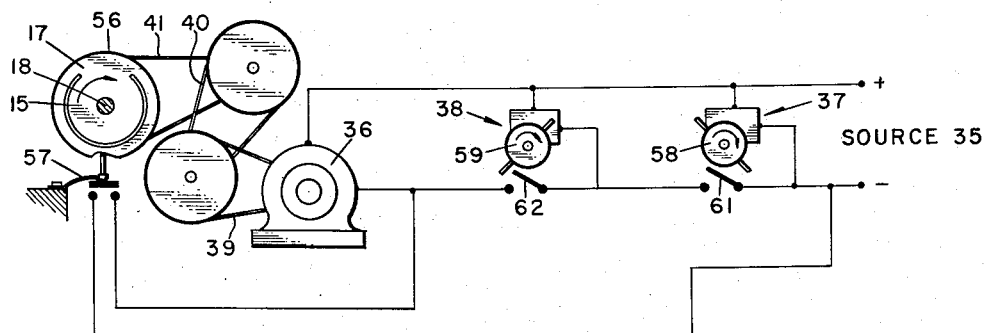
FIG. 4 is a diagrammatic view of the drive mechanism and control circuit for the feeder.

In FIG. 4, the preferred control circuit and drive mechanism are shown in greater detail. The source of electrical power 35 is connected to an electrical motor 36; e.g., a ¼ horsepower D.C. electric motor, through 24 hour and 12 minute repeat cycle timers 37 and 38, respectively. One terminal of source 35 also connects to switch 57 which, in turn, is coupled to a common terminal of motor 36 and switch 62. Both timers 37 and 38 are commercially available types and essentially include rotatable members 58 and 59 provided, respectively, with switch tripping elements for actuating the circuit make and break elements 61 and 62, respectively.

The apparatus of FIG. 5 is a modification of drum 15 in which a cylindrical rotary drum 70 is provided with a non-spiralled "window" or opening 71 one edge of which is serrated. The other parts of the apparatus shown are the same as those described with regard to the drum 15 embodiment.

In FIG. 6 a cylindrical drum 80 similar to drum 15 is shown. The difference between the two showings reside in the number of openings. Only one opening 81 is provided along the length of drum 80 between end plates 16 and 17 instead of two openings 30, 31 formed along the length of drum 15 as previously described.

*Operation*

The apparatus shown in FIG. 1 is placed in a feed lot or pasture and storage bin 10 is filled with feed through the opening in roof 11 covered by lid 12. The feed is contained in storage bin 10 above divider plate 22. The power source 35 is conected and the 24-hour timer 37 is continuously on causing continuous rotation of rotatable member 58 and at preselected time intervals the trip element on rotatable member 58 closes for a period of 12 minutes switch element 61 which causes 12-minute timer 38 to actuate and rotate member 59 to close switch element 62 through its trip element. Switch element 62 may be closed for desired times varying from 10 seconds to 12 minutes. Closing of switch element 62 actuates motor 36 which, through drives 39, 40, and 41, rotates shaft 18 and initiation of rotation of shaft 18 closes switch 57 by means of cam surface 56.

This variable "on" circuit controls the number of dumps or revolutions made by dump barrel 15. Micro switch 57 actuated by cam surface 56 on drum 15 serves as the master control switch to position drum 15.

Thus, electrical current is supplied continuously to 24-hour timer 37 and at preselected time intervals the 12-minute timer 38 is actuated for periods of 12 minutes. After the 12-minute timer 38 begins, the variable "on" period is initiated. This starts motor 36 and rotates the rotary barrel 15 thus actuating micro master switch 57 by the cam action of surface 56. As an example of the operation, by setting the 12-minute timer 38 to actuate switch element 62 for an "on" period of 10 seconds, the circuit will go to the "off" position after drum 15 has rotated two-thirds of one revolution when there is 15 seconds per revolution of drum 15. The micro master switch 57 is maintained in the "on" position by the cam surface 56 which maintains the circuit allowing drum 15 to return to its original start position at which point the circuit is broken.

On the other hand, if the 12-minute timer 38 is set for 25 seconds initiated "on" time of switch element 62, drum 15 will complete one and two-thirds revolutions on current through the variable time circuit. The micro master switch 57 then will allow drum 15 to complete the second revolution. With a 12-minute cycle timer, the drum 15 could complete 48 revolutions in a 12-minute period.

As seen more clearly in FIG. 3, rotation of drum 15 rotates opening 31 from the uppermost fill position to the lowermost dump-position, not shown, in which latter position the feed contained in drum 15 dumps into the dump chute portion 64 of bin 10 and thence into the feed trough 32. Rotation of drum 15 also rotates shaft 26 through drive 42 which agitates the feed above opening 30 by means of agitators 27. The design of dump chute 64 is such that an excess of feed in trough 32 plugs feed exits 65 and 66 thereby causing feed to accumulate and fill chute 64 and preventing additional feed from discharging from drum 15.

The design of drum 15 including spiraling of the openings 30, 31 permits use of a minimum amount of horsepower for the feed particles protruding from drum 15 are sheared between tapered edges 34 of the cuts in drum 15 and tapered edge 43 of guard plate 28 and between tapered edges 34 and tapered edge 44 of guard plate 29 when feed is admitted to and discharged from drum 15, respectively. Similar effects are achieved when the serrated edge 71 of cylinder 70 (FIG. 5) or the single opening 81 of cylinder 80 (FIG. 6) are used instead.

Having fully described the nature, operation, elements, and objects of my invention, I claim:

1. Livestock feeding apparatus comprising a frame; a V-shaped storage bin having an upper feed fill opening and a lower feed dump opening and supported on said frame; a closure covering the upper feed fill opening in said storage bin; a catch trough arranged on said frame below said lower feed dump opening in said storage bin; a rotatable, cylindrical drum having end plates closing each end thereof arranged in said storage bin and adapted to serve as a dump drum for said feed; a divider plate extending through said storage bin and supported on said storage bin and said frame; two guard plates each having upper and lower ends and each configured to the curvature of the wall of said drum and each pivotally connected on one end thereof to said divider plate, said divider plate together with said guard plates defining a feed passage within said bin having an entrance defined by the space between the upper ends of said guard plates and an exit defined by the space between the lower ends of said guard plates; spring biasing means interconnecting and biasing the other ends of said guard plates toward each other, the upper end of one of said guard plates and the lower end of said other guard plate being beveled; means defining an opening in said drum extending along the length thereof adapted to effect a shearing action on feed trapped between one edge of the opening and the beveled ends of the guard plates upon rotation of said drum; a rotatable feed agitator mounted in said storage bin above said drum; removable volume changers arranged in said drum adapted to vary the volume thereof; a cam surface formed on one of said end plates; an electrical switch; a cam rider engaging said cam surface adapted to actuate said electrical switch once in each rotation of said drum; drive means for rotating said drum and said agitator; means for powering said drive means; and an electrical circuit and additional switch means coupling said electrical cam rider operated switch, said drive means and said power means together whereby said drum is rotated at least one revolution at pre-selected times.

2. Apparatus as recited in claim 1 wherein said means including an opening in said drum comprises at least one spiral cut extending along the length of said drum.

3. Apparatus as recited in claim 2 in which the width of said spaces between the upper and lower ends of said guard plates, the width of said cut, and the degree of spiral of said cut being related to each other such that in at least one rotational position of said drum feed contained in said bin cannot gravitate directly into said catch trough through said drum.

4. Apparatus as recited in claim 1 wherein said means including an opening in said drum includes a cut in said drum, one edge of which is serrated.

5. Livestock feeding apparatus comprising a frame; a storage bin having an upper feed fill opening and a lower feed dump opening supported on said frame; a rotatable, generally cylindrical drum closed at each end, arranged in said storage bin and adapted to serve as a dump drum for said feed; a divider plate extending through said storage bin and supported on said storage bin and said frame; guard means having upper and lower ends and formed to the curvature of the wall of said drum pivotally supported on said divider plate on one of the ends thereof and arranged on each side of said drum; spring biasing means adapted to bias the other ends of said guard means toward each other; said divider plate together with said guard means defining a feed passage within said bin having an entrance defined by a space between the upper ends of said guard means and an exit defined by a space between the lower ends of said guard means; means including an opening in said drum extending along the length thereof adapted to effect a shearing action on feed trapped between one edge of the opening and one edge of one of the guard means upon rotation of said drum; and means adapted to rotate said drum at least one revolution at preselected times.

6. Apparatus as recited in claim 5 wherein said means including an opening in said drum comprises at least one spiral cut extending along the length of said drum.

7. Apparatus as recited in claim 6 in which the width of said spaces between the upper and lower ends of said guard means, the width of said cut, and the degree of spiral of said cut being related to each other such that in at least one rotational position of said drum feed contained in said drum cannot gravitate directly through said drum.

8. Apparatus as recited in claim 5 wherein said means including an opening in said drum includes a cut in said drum, one edge of which is serrated.

9. In apparatus for dispensing livestock feed from a storage bin into a trough the improvement comprising a rotatable, generally cylindrical drum closed at each end; two guard plates, each having upper and lower ends formed to the curvature of the wall of said drum and pivotally supported adjacent one of said ends on each side of said drum; spring biasing means biasing the other ends of said guard plates toward each other and means including an opening in said drum extending along the length thereof adapted to effect a shearing action on feed trapped between one edge of the opening and one end of one of the guard plates upon rotation of said drum whereby said drum rotates freely within said guard plates while at the same time achieving a shearing action at said guard plate ends, even though said drum may contain surface eccentricities and irregularities.

10. Apparatus as recited in claim 9 wherein said means including an opening in said drum comprises at least one spiral cut extending along the length of said drum.

11. Apparatus as recited in claim 10 in which said guard plates define a feed passage within said bin having an entrance defined by a space between the upper ends of said guard plates and an exit defined by the space between the lower ends of said guard plates, the width of said spaces between the upper and lower ends of said guard plates, the width of said cut, and the degree of spiral of said cut being related to each other such that in at least one rotational position of said drum, feed cannot gravitate directly through said drum.

12. Apparatus as recited in claim 9 wherein said means including an opening in said drum includes a cut in said drum, one edge of which is serrated.

References Cited in the file of this patent

UNITED STATES PATENTS

| | | |
|---|---|---|
| 1,342,456 | Nagel | June 8, 1920 |
| 1,402,184 | Sinclair | Jan. 3, 1922 |
| 2,100,284 | Kriechbaum | Nov. 23, 1937 |
| 2,317,274 | Johnson | Apr. 20, 1943 |
| 2,669,218 | Erickson | Feb. 16, 1954 |
| 2,801,610 | Wallace et al. | Aug. 6, 1957 |
| 2,981,229 | Brown | Apr. 25, 1961 |

FOREIGN PATENTS

| | | |
|---|---|---|
| 396,825 | Germany | June 11, 1924 |
| 673,137 | Germany | Mar. 17, 1939 |
| 704,254 | Great Britain | Feb. 17, 1954 |
| 148,871 | Sweden | Feb. 15, 1955 |